United States Patent
Yamada

[11] Patent Number: 5,812,172
[45] Date of Patent: Sep. 22, 1998

[54] IMAGE READING AND PRINTING UNIT

[75] Inventor: Akira Yamada, Kawasaki, Japan

[73] Assignee: Fujitsu Limited, Kawasaki, Japan

[21] Appl. No.: 844,679

[22] Filed: Apr. 21, 1997

Related U.S. Application Data

[63] Continuation of Ser. No. 340,302, Nov. 14, 1994, Pat. No. 5,635,973.

[30] Foreign Application Priority Data

Jan. 10, 1994 [JP] Japan .................................. 6-000844

[51] Int. Cl.$^6$ ................................. H04N 1/04; B41J 2/32
[52] U.S. Cl. ......................... 347/171; 358/296; 358/472
[58] Field of Search ................................. 358/296, 472; 347/171

[56] References Cited

U.S. PATENT DOCUMENTS

| | | | |
|---|---|---|---|
| 4,266,250 | 5/1981 | Heinzl et al. | 358/285 |
| 5,047,870 | 9/1991 | Filo | 358/472 |
| 5,070,410 | 12/1991 | Hadley | 358/472 |

FOREIGN PATENT DOCUMENTS 2 152 326  7/1985  United Kingdom.

OTHER PUBLICATIONS

*Patent Abstracts of Japan*, vol. 6, No. 9 (E–090), Jan. 20, 1982 & JP–A–56 132058 (Hitachi Ltd), Oct. 16, 1981.
*Patent Abstracts of Japan*, vol. 12, No. 396 (P–774), Oct. 21, 1988 & JP–A–63 137278 (Konica Corp), Jun. 9, 1988.
*Patent Abstracts of Japan*, vol. 15, No. 394 (E–1119), Oct. 7, 1991 & JP–A–03 159367 (Canon Inc), Jul. 9, 1991.
*Patent Abstracts of Japan*, vol. 16, No. 440 (M–1310), Sep. 14, 1992 & JP–A–04 153140 (Toshiba Corp), May 26, 1992.
*Patent Abstracts of Japan*, vol. 17, No. 641 (M–1516), Nov. 29, 1993 & JP–A–05 201584 (Mita Ind Co Ltd), Aug. 10, 1993.

*Primary Examiner*—Huan H. Tran
*Attorney, Agent, or Firm*—Staas & Halsey

[57] ABSTRACT

An image reading and printing unit includes a carriage movable in a scan direction perpendicular to a transport direction of a sheet that is transported, a carriage moving part for moving the carriage in the scan direction, a platen arranged parallel to the scan direction with the transported sheet interposed between the platen and the carriage for cooperating a transfer of an image onto the sheet, a print head mounted on the carriage for printing the image on the sheet in a printing mode by moving from a receded position to a print position towards the sheet on the platen under the cooperation of the platen, an image sensor mounted on the carriage together with the print head for reading an image printed on the transported sheet in a reading mode, and a sensor moving part for moving the image sensor to make contact with the sheet on the platen in the reading mode so as to read the image printed on the sheet.

21 Claims, 7 Drawing Sheets

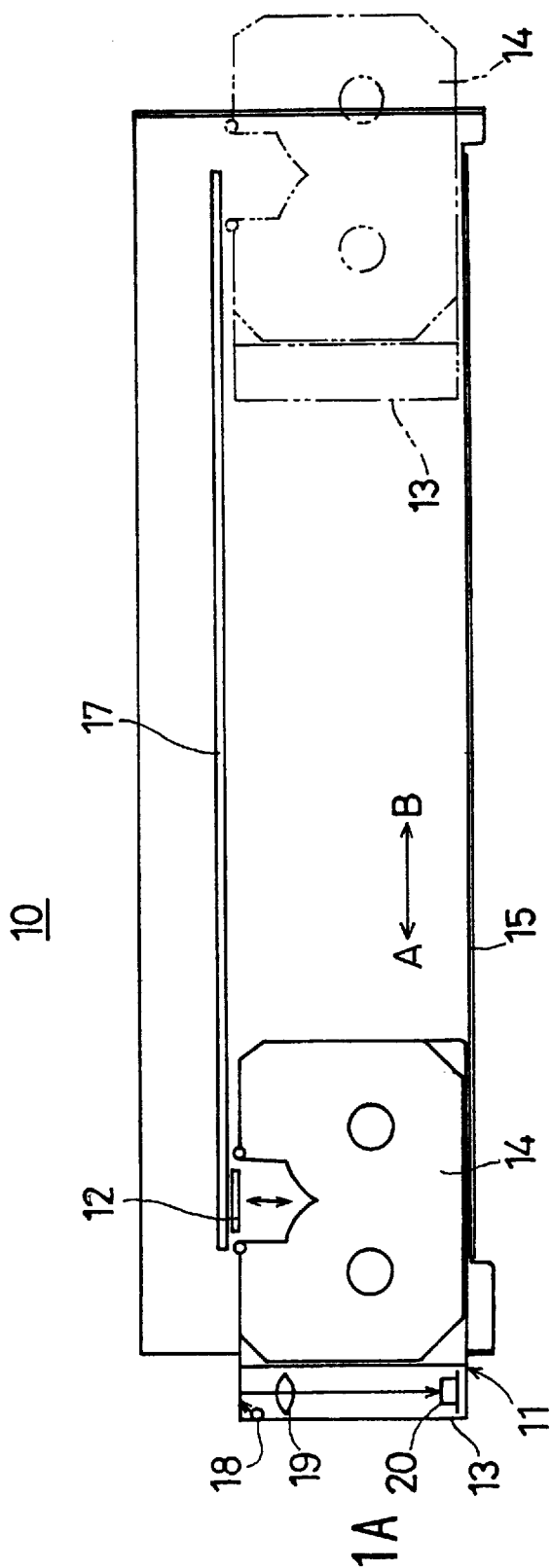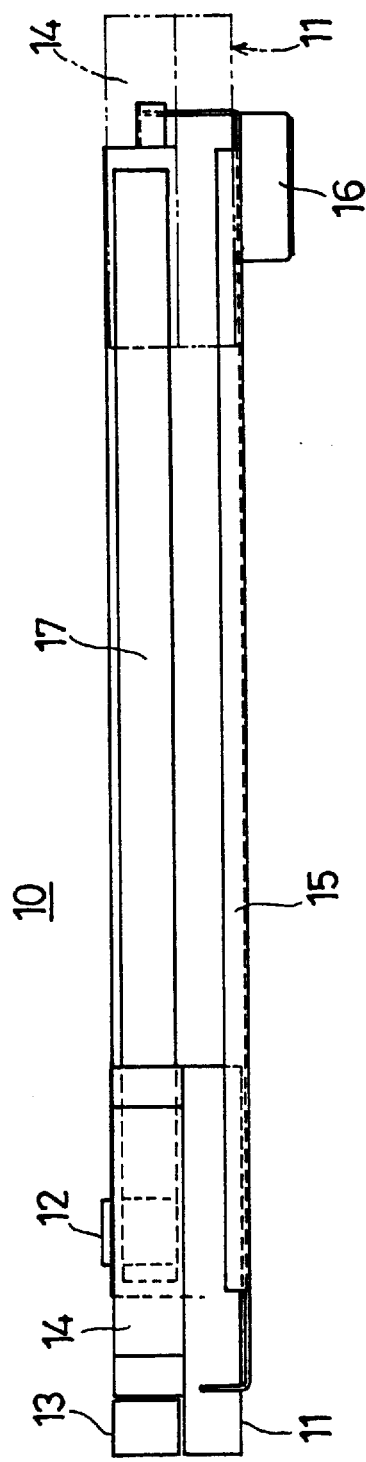
FIG. 1A
FIG. 1B

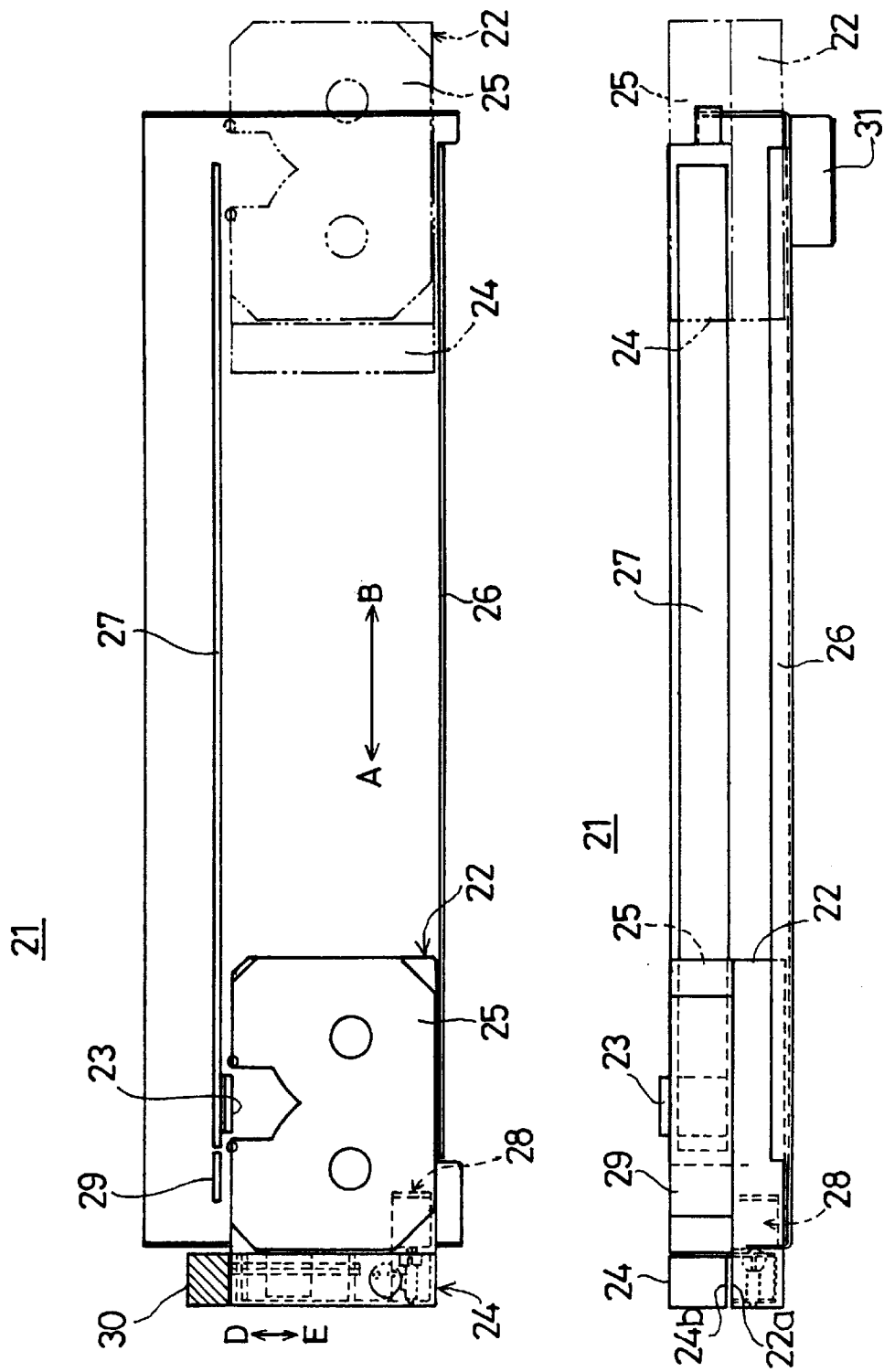

IMAGE READING AND PRINTING UNIT

This application is a continuation of application Ser. No. 08/340,302, filed Nov. 14, 1994, now U.S. Pat. No. 5,635,973.

BACKGROUND OF THE INVENTION

The present invention generally relates to image reading and printing units, and more particularly to an image reading and printing unit which is mounted on a carriage of a serial printer and reads and prints images.

Recently, proposals have been made to mount an image sensor on a carriage which moves a printing head of a serial printer, so as to carry out functions of an image scanner. In other words, the carriage prints an image on a sheet that is transported, and reads the printed document. Hence, there are demands to improve the quality of the reading with respect to the transported document, and it is necessary to prevent focal error, change in magnification and the like caused by flapping or the like of the transported document.

FIGS. 1A and 1B show the construction of a conceivable carriage mounted with an image sensor. FIG. 1A is a plan view generally showing a carriage part of a serial printer, and FIG. 1B is a front view generally showing this carriage part.

A thermal serial printer 10 shown in FIGS. 1A and 1B includes a carriage 11, and a thermal head 12 and an image sensor 13 which are mounted on the carriage 11. In a case where a plain paper is used as the recording sheet, a ribbon cassette 14 is also mounted on the carriage 11. This ribbon cassette 14 accommodates a ribbon made up of a thermal transfer film. The carriage 11 is moved in a scan direction A or B which is perpendicular to a transport direction of the sheet by a driving part 16 under the guidance of a guide part 15. The recording sheet is transported at the time of printing, and the document is transported at the time of reading. In addition, a platen 17 is arranged along the scan direction to confront the thermal head 12.

The image sensor 13 is provided on the side of the ribbon cassette 14 and has an opening confronting the platen 17. The image sensor 13 is made up of a compact optical system including a light source 18, a lens 19 and a solid state image pickup (or reading) element 20 arranged on an optical axis of the lens 19. The light source 18 and the lens 19 are arranged in a vicinity of the opening of the image sensor 13. In this case, the focal point of the image sensor 13 is adjusted by the lens 19 to the sheet on the platen 17.

At the time of the printing, the thermal transfer film (ribbon) of the ribbon cassette 14 is interposed between the recording sheet that is transported on the platen 17 and the thermal head 12 and is pushed by the thermal head 12, so that ink of the thermal transfer film is transferred onto the recording sheet. On the other hand, at the time of the reading, the thermal head 12 is at a receded position with respect to the printed document that is transported, and the light source 18 of the image sensor 13 is turned ON so as to read the document by the solid state image pickup element 20 as the carriage 11 moves.

Although not shown in FIGS. 1A and 1B, the sheet is transported in this serial printer 10 by transport rollers which are arranged in a vicinity of a supply side relative to the platen 17. Generally, no transport means is arranged on an eject side relative to the platen 17.

However, a gap on the order of 1 mm, for example, is inevitably formed between the platen 17 and the image sensor 13. As a result, the flapping or the like of the document occurs with respect to the document that is transported within the range of this gap, and a focal error, a change in the magnification or the like of the lens 19 are generated thereby. For this reason, there is a problem in that the quality of the reading deteriorates because a stepped part occurs at a connecting part particularly when reading an oblique line.

It is conceivable to increase the depth of field, however, the optical path will become long, and in this case, there is a problem in that the size of the serial printer becomes large.

SUMMARY OF THE INVENTION

Accordingly, it is a general object of the present invention to provide a novel and useful image reading and printing unit in which the problems described above are eliminated.

Another and more specific object of the present invention is to provide an image reading and printing unit comprising a carriage movable in a scan direction perpendicular to a transport direction of a sheet that is transported, carriage moving means for moving the carriage in the scan direction, transfer means, arranged parallel to the scan direction with the transported sheet interposed between the transfer means and the carriage, for cooperating a transfer of an image onto the sheet, printing means, mounted on the carriage, for printing the image on the sheet in a printing mode by moving from a receded position to a print position towards the sheet on the transfer means under the cooperation of the transfer means, image reading means, mounted on the carriage together with the printing means, for reading an image printed on the transported sheet in a reading mode, and moving means for moving the image reading means to make contact with the sheet on the transfer means in the reading mode so as to read the image printed on the sheet. According to the image reading and printing unit of the present invention, it is possible to prevent focal error and change in magnification of the image reading means that is formed by a compact optical system. In addition, there is no need to increase the depth of field in order to prevent the focal error, and the quality of the reading can be improved while maintaining the reduced size of the image reading and printing unit.

Other objects and further features of the present invention will be apparent from the following detailed description when read in conjunction with the accompanying drawings.

BRIEF DESCRIPTION OF THE DRAWINGS

FIGS. 1A and 1B respectively are a plan view and a front view generally showing a conceivable carriage part of a serial printer;

FIGS. 2A and 2B respectively are a plan view and a front view generally showing an embodiment of an image reading and printing unit according to the present invention;

DESCRIPTION OF THE PREFERRED EMBODIMENTS

Figure 3:
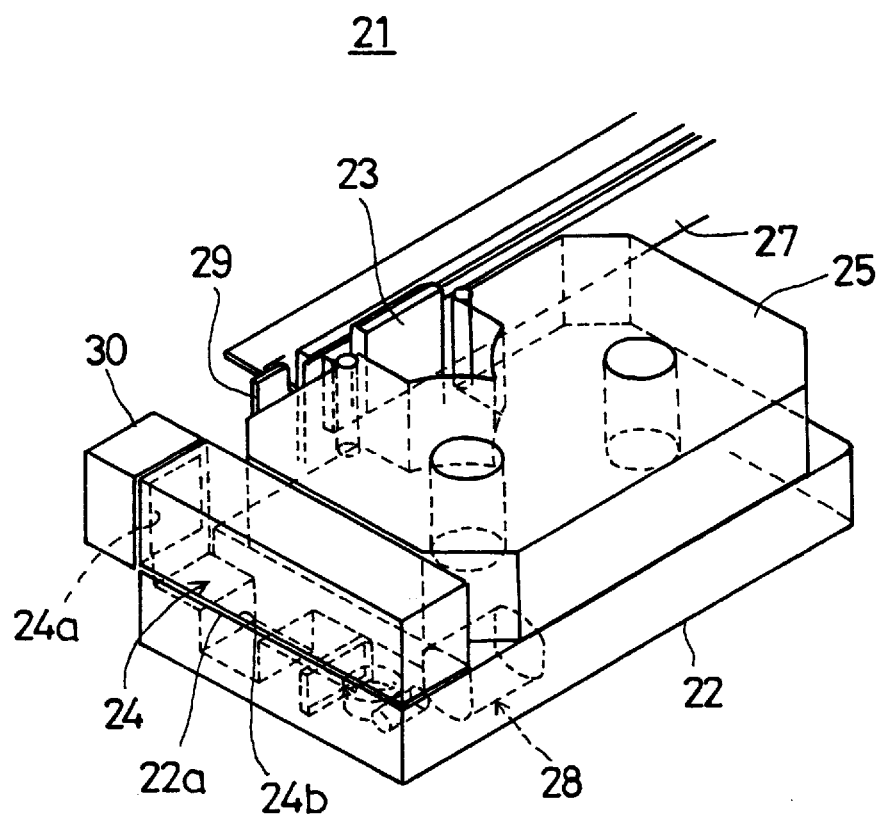
FIG. 3 is a perspective view generally showing a carriage part of the embodiment.

FIGS. 2A and 2B respectively are a plan view and a front view generally showing an embodiment of an image reading and printing unit according to the present invention. FIG. 3 is a perspective view generally showing a carriage part of this embodiment.

In FIGS. 2A, 2B and 3, an image reading and printing unit 21 of a thermal serial printer includes a carriage 22, and a thermal head 23 and an image sensor 24 which are mounted on the carriage. The thermal head 23 is provided as a printing means, and the image sensor 24 is provided as an image pickup (or reading) means. When a plain paper is used as a recording sheet, a ribbon cassette 25 is also mounted on the carriage 22. This ribbon cassette 25 accommodates a thermal transfer film having ink as a transfer material.

The carriage 22 is moved in a scan direction A or B which is perpendicular to a transport direction of the sheet by a sheet transport means under the guidance of a guide part 26, as will be described later in conjunction with FIG. 4. A platen 27 forming a transfer means is arranged along the scan direction to confront the thermal head 23. The thermal head 23 is movable along the platen 27.

The sheet used is a recording sheet such as a plain paper or a thermal paper at the time of the printing, and is a printed document at the time of the reading. The sheet is transported between the thermal head 23 and the platen 27 by the sheet transport means which will be described later with reference to FIG. 5.

Figure 7A:
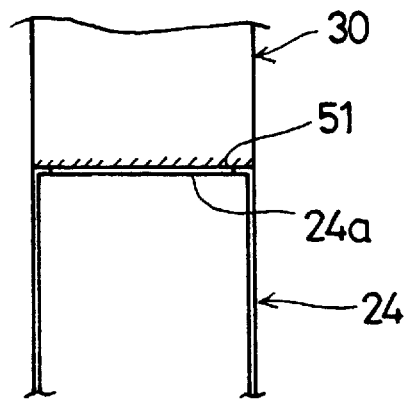
FIGS. 7A, 7B and 7C respectively are diagrams for explaining a cleaning means.
Figure 7B:
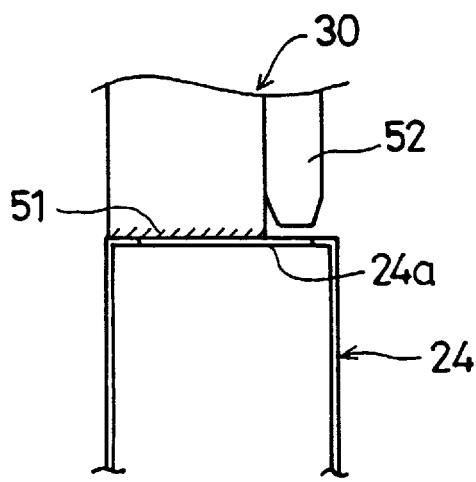
Figure 7C:
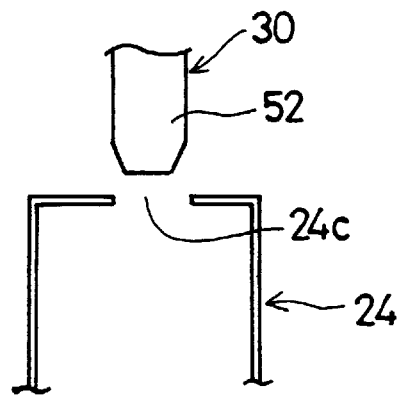

A transparent glass member 24a shown in FIGS. 7A and 7B is formed on a contacting surface of the image sensor 24 making contact with the document. Alternatively, a slit 24c shown in FIG. 7C is formed in the contacting surface of the image sensor 24 making contact with the document. The internal construction of the image sensor 24 is the same as that of the image sensor 13 shown in FIG. 1A, and the image sensor 24 includes a light source, a lens and a solid state image pickup element. For example, the image sensor 24 is provided on the left side of the ribbon cassette 25.

A sensor moving means 28 for moving the image sensor 24 along the platen 27 is provided within the carriage 22 and under the image sensor 24. The sensor moving means 28 will be described later in conjunction with FIGS. 6A and 6B. In this case, the required precision is obtained by an end surface 22a of the carriage 22 and an end surface 24b of the image sensor 24 which make contact with each other. Hence, the positional deviation of the image sensor 24 when it moves is restricted.

On the other hand, a white reference plate 29 for correcting a reading state of the image sensor 24 is provided on one end of the plate 27 on a home position side of the carriage 22. In addition, a cleaning means 30 is provided in a vicinity of the white reference plate 29, so that the cleaning means 30 makes contact with or closely confronts the image pickup surface of the image sensor 24 when the carriage 22 is at the home position. The cleaning means 30 will be described later in conjunction with FIGS. 7A through 7C.

Figure 4:
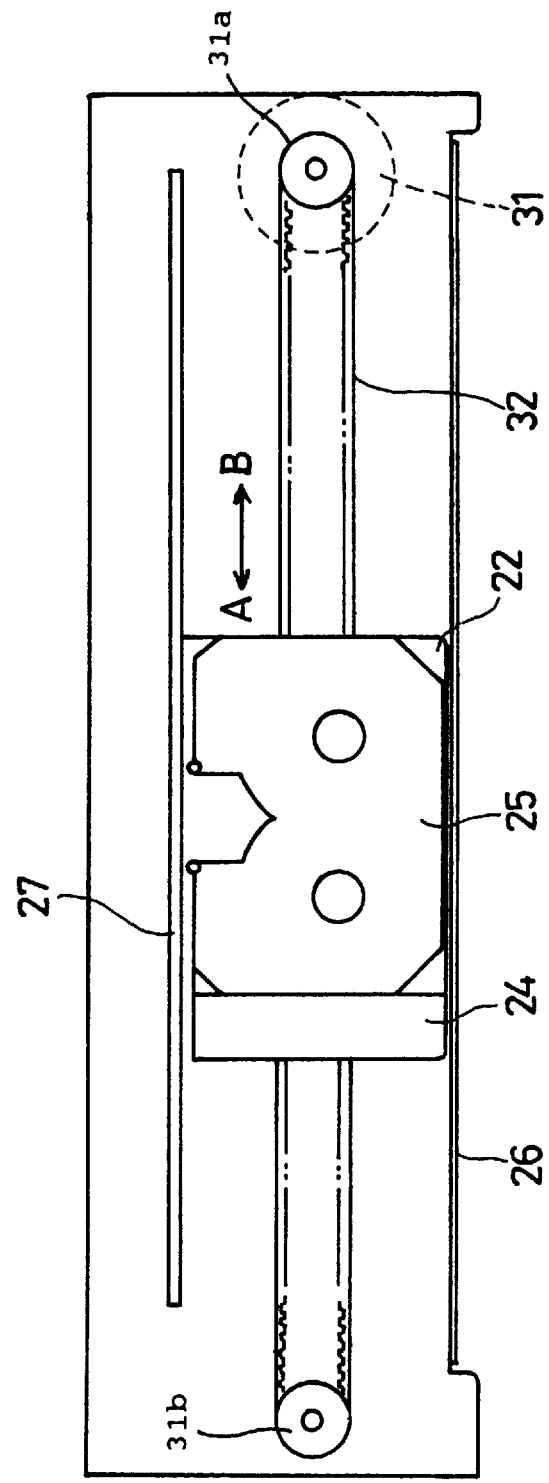
FIG. 4 is a plan view for explaining a carriage movement.

FIG. 4 is a plan view for explaining the movement of the carriage 22 shown in FIGS. 2A, 2B and 3. In FIG. 4, a driving motor 31 is provided on one end of a moving range of the carriage 22, The driving motor 31 rotates a pulley 31a, and is provided under the carriage 22 when viewed from the front. A timing belt 32 is provided across the pulley 31a and a pulley 31b which is provided at the other end of the moving range of the carriage 22. This timing belt 32 engages a lower part of the carriage 22, and the carriage 22 is moved in the scan direction A or B under the guidance of the guide part 26. Hence, the driving motor 31, the pulleys 31a and 31b, and the timing belt 32 form a carriage moving means.

Figure 5:
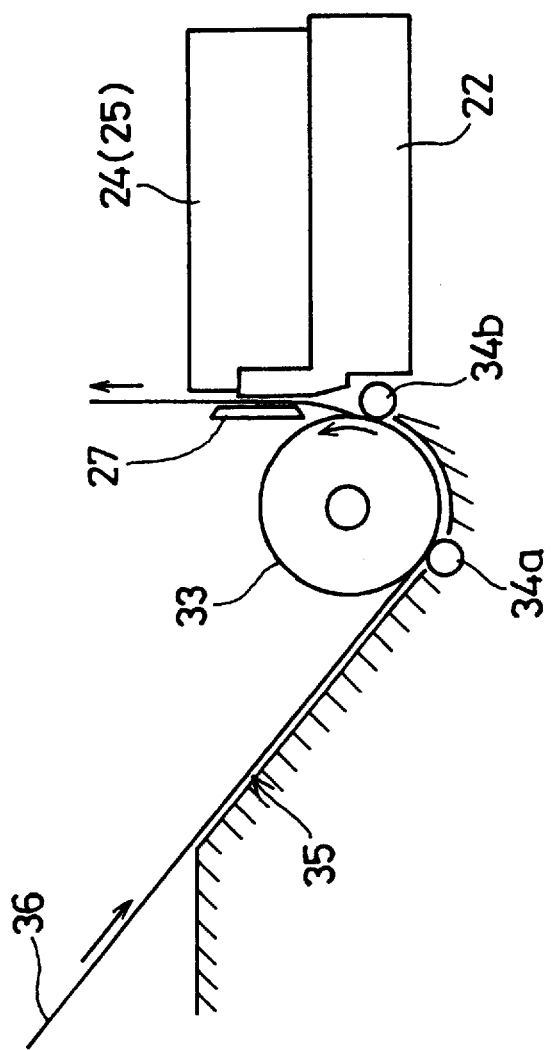
FIG. 5 is a cross sectional view for explaining a sheet transport.

FIG. 5 is a cross sectional view for explaining the sheet transport. A supply roller 33 and pinch rollers 34a and 34b are provided in a vicinity of the platen 27 and generally below the platen 27 when viewed from the side. The supply roller 33 and the pinch rollers 34a and 34b form the sheet transport means. A sheet 36 which may be the recording sheet or the document is supplied from a sheet supplying part 35 of the thermal serial printer. The supplied sheet 36 is transported between the platen 27 and the carriage 22 (and the thermal head 23) by the supply roller 33 and the pinch rollers 34a and 34b. Of course, a plurality of supply rollers 33, a plurality of pinch rollers 34a and a plurality of pinch rollers 34b may be provided along the platen 27.

Figure 6A:
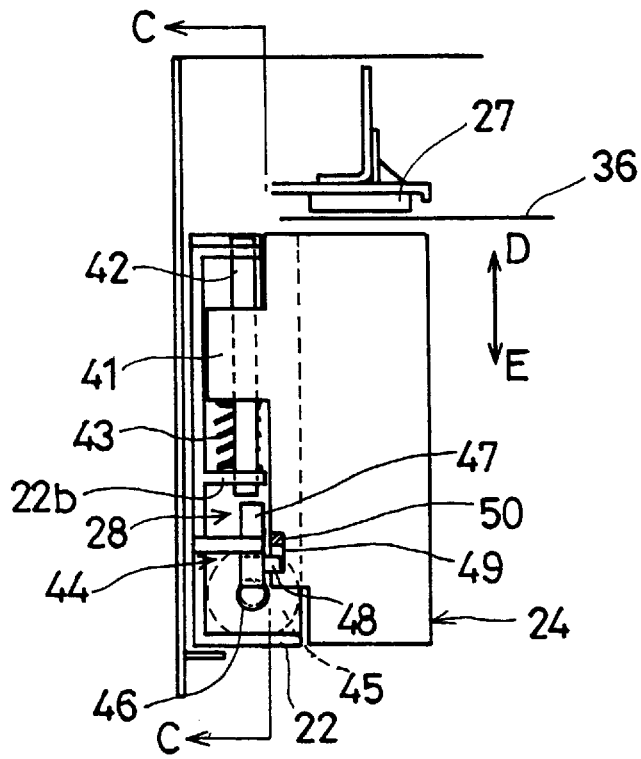
FIGS. 6A and 6B respectively are cross sectional views showing the construction of a sensor moving means.
Figure 6B:
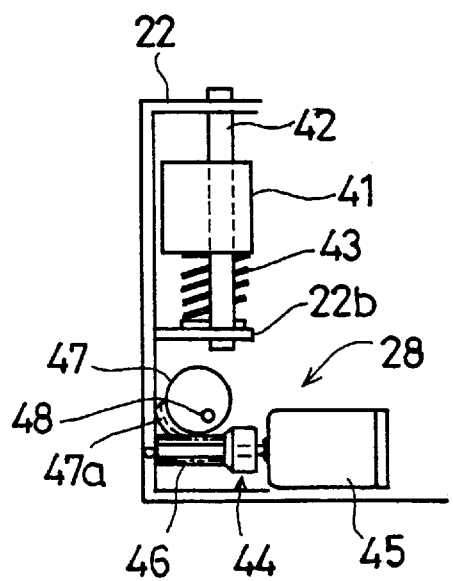

FIGS. 6A and 6B respectively are cross sectional views showing the construction of the sensor moving means. FIG. 6A shows a cross section of the left side of the sensor moving means, and FIG. 6B shows a cross section along a line C—C in FIG. 6A.

In FIGS. 6A and 6B, a holder 41 is integrally formed on the image sensor 24. A support plate 22b is integrally formed on the carriage 22, and a shaft 42 which functions as a guide part is fixed across a side plate of the carriage 22 and the support plate 22b. The holder 41 movably engages this shaft 42. In this case, a coil spring 43 which urges the holder 41 in a direction D is interposed between the support plate 22b and the holder 41.

The sensor moving means 28 is provided with a driving mechanism 44 for linearly moving the image sensor 24 in the direction D or E using the shaft 42 as the guide. The image sensor 24 makes contact with the document 36 when moved in the direction D. The driving mechanism 44 includes a motor 45 as its driving part, and this motor 45 can rotate in forward and reverse directions.

A worm gear 46 is fixed on a rotary shaft of the motor 45, and a partially toothed gear 47 engages this worm gear 46. This partially toothed gear 47 has gear teeth 47a provided only on a portion of its circumference. The worm gear 46 and the partially toothed gear 47 form a transmitting part. A pin 48 is provided at an eccentric position of the partially toothed gear 47, and this pin 48 engages an elongated hole 49 in the holder 41. The elongated hole 49 extends in the directions D and E. A sponge 50 is provided in the elongated hole 49 as an urging member. Of course, a coil spring, a leaf spring, rubber and other resilient members may be used in place of the sponge 50 to form the urging member.

When the motor 45 rotates in the forward direction, the partially toothed gear 47 turns because the partially toothed gear 47 meshes with the worm gear 46 for the span of the gear teeth 47a. As a result, the pin 48 on the partially toothed gear 47 moves linearly within the elongated hole 49 in the holder 41. Accordingly, the image sensor 24 is moved in the direction D due to the driving force of the pin 48 and the urging force of the coil spring 43, and makes contact with the document 36 that is transported on the platen 27. In this case, the pressure with which the contacting surface of the image sensor 24 makes contact with the document 36 is determined by the urging force of the coil spring 43, and the pressure is 100 g to 150 g, for example.

In this state, an end of the gear teeth 47a of the partially toothed gear 47 is once disengaged from the worm gear 46. However, the pin 48 pushes against the sponge 50 provided within the elongated hole 49, and the restoration force (urging force) of the sponge 50 pushes the image sensor 24 back in the direction E. As a result, the end of the gear teeth 47a of the partially toothed gear 47 and the worm gear 46 are engaged in the state where the image sensor 24 makes contact with the document 36.

Next, when the motor 45 is rotated in the reverse direction, the pin 48 is moved linearly in the direction E due to the meshing of the worm gear 46 and the gear teeth 47a of the partially toothed gear 47. Hence, the contact between the image sensor 24 and the document 36 is released.

Therefore, the moving quantity (or distance) of the image sensor 24 in the directions D and E is determined by the span or length of the gear teeth 47a of the partially toothed gear 47, and the image sensor 24 can be positioned by rotating the motor 45 in the forward or reverse direction and stopping the motor 4. In other words, it is possible to position the image sensor 24 along the directions D and E without having to detect the position of the image sensor 24, and the image sensor 24 can be fixed to a predetermined position by a simple operation of controlling the motor 45 to rotate for a predetermined time and to stop. Of course, if the partially toothed gear 47 is not used, it is possible to provide limit switches within the moving range of the image sensor 24 for the purposes of detecting the position and restricting the movement of the image sensor 24.

The image sensor 24 makes contact with the document 36 only when reading the document 36. The contact between the image sensor 24 and the document 36 is released at the time of the printing or when returning the image sensor 24 to the home position after reading 1 line. Since the image sensor 24 does not constantly make contact with the document 36, it is possible to prevent the sheet 36 (document or recording sheet) from being damaged by the contact. In addition, it is possible to smoothly transport the sheet 36 when initially setting the sheet 36 in the image reading and printing unit 21.

In this embodiment, the driving mechanism 44 is formed by the driving part (motor 45) and the transmitting part (worm gear 36, partially toothed gear 47 and pin 48). However, it is possible to realize the driving mechanism 44 using a solenoid, an electromagnetic clutch and the like.

FIGS. 7A through 7C are diagrams for explaining the cleaning means 30 shown in FIGS. 2A and 2B. FIGS. 7A and 7B show cases where the glass member 24a is provided at the contact surface of the image sensor 24, and FIG. 7C shows a case where the slit 24c is provided at the contacting surface of the image sensor 24.

In FIG. 7A, the cleaning means 30 is arranged so that an end surface thereof makes contact with the glass member 24a at the contacting surface of the image sensor 24 when the image sensor 24 is located at the home position. A cleaning member 51 is provided at this end surface of the cleaning means 30. For example, felt, gauze, brush and the like may be used as the cleaning member 51. This cleaning member 51 removes dirt, dust particles, paper powder and the like that adhere on the glass member 24a due to the contact between the image sensor 24 and the sheet 36.

In FIG. 7B, the cleaning means 30 includes the cleaning member 51 and an air suction nozzle 52. The cleaning effect of the cleaning means 30 is improved because the dirt, dust particles, paper powder and the like adhered on the glass member 24a are wiped off by the cleaning member 51 and any residual dirt, dust particles, paper powder and the like are removed under suction by the air suction nozzle 52.

On the other hand, in FIG. 7C, the slit 24c is provided in the contacting surface of the image sensor 24. Since dirt, dust particles, paper powder and the like are easily accumulated in the vicinity of the slit 24c, the air suction nozzle 52 is provided in a vicinity of the slit 24c so as to effectively clean the contacting surface of the image sensor 24.

When carrying out the printing operation with respect to the recording sheet 36 in the image reading and printing unit 21 described above, the image sensor 24 is at the position receded in the direction E by the sensor moving means 28. With respect to the recording sheet 36 that is transported onto the platen 27 by the supply roller 33 and the like, the thermal head 23 is moved to push against the thermal transfer film of the ribbon cassette 25. The printing of one line is made from the left end towards the direction B in FIG. 4, for example, and a predetermined number of lines can be printed in this manner.

Next, a description will be given of the reading operation of the image reading and printing unit 21. When the carriage 22 is located at the home position, that is, when the thermal head 23 is located at a print startable position, the image sensor 24 is at the receded position and is in contact with the cleaning means 30 if the cleaning member 51 is used. The image sensor 24 is at the receded position and confronts the cleaning means 30 if only the air suction nozzle 52 is used. When the document 36 to be read is transported onto the platen 27, the carriage 22 is moved in the direction B and is stopped at a position where the contacting surface (for example, the glass member 24a) confronts the white reference plate 29. Then, the image sensor 24 is moved by the sensor moving means 28 in the direction D so as to make contact with the white reference plate 29.

In this state, the image sensor 24 makes a normal read operation by irradiating the light from the light source on the white reference plate 29 and reading the reflected light via the lens and the solid state image pickup element. As a result, it is possible to detect the quantity of light (or light intensity) emitted from the light source, and a change in the light intensity during a settling time at the initial start or caused by deterioration of the light source due to aging can be detected. In other words, it is possible to store as a reference value the light intensity that is received when reading the white reference plate 29 at the start of the read operation, and correct a set threshold value of an output of the solid state image pickup element based on the stored reference value. As a result, it is possible to make a normal or correct read operation even when the light intensity changes for some reason, and a high resolution of 400 dpi or greater can be realized, for example.

Thereafter, the carriage 22 is moved to a read start position, and the contacting surface (for example, the glass member 24a) of the image sensor 24 is pushed against the document 36. In addition, the carriage 22 is moved in the scan direction A or B to read 1 line of the document 36. Such a read operation is made for a predetermined number of lines of the document 36. In this case, it is possible to carry out the read operation only when the carriage 22 moves in the direction B or, when the carriage 22 moves in both the directions A and B.

It is possible to bring the contacting surface of the image sensor 24 to the position of the cleaning means 30 by moving the carriage 22 to the home position every time one line is read along the scan direction B or every time 2 lines are read along the scan directions B and A.

Accordingly, at the time of the reading, the document 36 is pushed against the platen 27 by the contacting surface of the image sensor 24, and the flapping or the like of the document 36 will not occur. For this reason, it is possible to prevent focal error and change in magnification of the image sensor 24 that is formed by the compact optical system. In addition, there is no need to increase the depth of field in order to prevent the focal error, and the quality of the reading can be improved while maintaining the reduced size of the image reading and printing unit 21.

On the other hand, because the contacting surface of the image sensor 24 makes contact with or closely confronts the cleaning means 30 when the carriage 22 returns to the home position, the maintenance of the image reading and printing unit 21 becomes unnecessary for a long period of time, and a stable read operation can be maintained for a long period of time.

Further, the present invention is not limited to these embodiments, but various variations and modifications may be made without departing from the scope of the present invention.

What is claimed is:

1. An image reading and printing unit for reading images from and writing images to a sheet, comprising:

a carriage movable in a scan direction;

a sheet transport mechanism for moving the sheet in a direction perpendicular to the scan direction;

a printing mechanism mounted on the carriage in a writing mode, for writing images to the sheet in the writing mode;

a scanner mounted on the carriage in a reading mode, the scanner having an imaging system for reading images from the sheet in the reading mode; and a scanner moving mechanism for moving the scanner into contact with the sheet in the reading mode and out of contact with the sheet in the writing mode.

2. The image reading and printing unit as claimed in claim 1, wherein said printing mechanism includes a thermal head.

3. The image reading and printing unit as claimed in claim 2, wherein said printing mechanism further includes a thermal transfer film.

4. The image reading and printing unit as claimed in claim 1, further comprising a reference plate provided at a predetermined position along the scan direction, said reference plate being used for correcting a read state of said imaging system.

5. The image reading and printing unit as claimed in claim 1, wherein said scanner moving mechanism includes a guide part having said scanner movable provided thereon, and a driving mechanism linearly moving said scanner towards the sheet under guidance of the guide part.

6. The image reading and printing unit as claimed in claim 5, wherein said scanner moving mechanism includes an urging member urging said scanner in a direction away from the sheet.

7. The image reading and printing unit as claimed in claim 1, wherein the printing mechanism moves toward the sheet in the writing mode and away from the sheet in the reading mode.

8. The image reading and printing unit as claimed in claim 1, wherein the carriage moves between first and second ends in the scan direction, wherein the scanner has a contact surface which contacts the sheet in the reading mode, a transport member being provided in the contact surface, and the unit further comprises a cleaner provided at the first end of the scan direction to clean the transparent member when the carriage is located at the first end.

9. The image reading and printing unit as claimed in claim 8, wherein said cleaner includes a cleaning member selected from the group consisting of felt, gauze and brush.

10. The image reading and printing unit as claimed in claim 9, wherein said cleaner further includes an air suction nozzle cleaning the transparent member of said scanner under suction.

11. The image reading and printing unit as claimed in claim 1, wherein the carriage moves between first and second ends in the scan direction, wherein the scanner has a contact surface which contacts the sheet in the reading mode, a slit being provided in the contact surface, and the unit further comprises a cleaner provided at the first end of the scan direction to clean the contact surface in the vicinity of the slit when the carriage is located at the first end.

12. The image reading and printing unit as claimed in claim 11, wherein said cleaner includes an air suction nozzle cleaning the contact surface of said scanner, in the vicinity of the slit, under suction.

13. An image reading and moving unit for reading an image from a sheet, comprising:

a carriage movable in a scan direction;

a sheet transport mechanism for moving the sheet in a direction perpendicular to the scan direction;

a scanner mounted on the carriage, the scanner having an imaging system for reading an image from the sheet; and a scanner moving mechanism for moving the scanner into contact with the sheet in an activated mode and out of contact with the sheet in a deactivated mode.

14. The image reading and moving unit as claimed in claim 13, wherein the carriage moves between first and second ends in the scan direction, wherein the scanner has a contact surface which contacts the sheet in the activated mode, a transparent member being provided in the contact surface, and the unit further comprises a cleaner provided at the first end of the scan direction to clean the transparent member when the carriage is located at the first end.

15. The image reading and moving unit as claimed in claim 14, wherein said cleaner includes a cleaning member selected from the group consisting of felt, gauze and brush.

16. The image reading and moving unit as claimed in claim 15, wherein said cleaner further includes an air suction nozzle cleaning the transparent member of said scanner under suction.

17. The image reading and moving unit as claimed in claim 13, wherein the carriage moves between first and second ends in the scan direction, wherein the scanner has a contact surface which contacts the sheet in the activated mode, a slit being provided in the contact surface, and the unit further comprising a cleaner provided at the first end of the scan direction to clean the contact surface in the vicinity of the slit when the carriage is located at the first end.

18. The image reading and moving unit as claimed in claim 17, wherein said cleaner includes an air suction nozzle cleaning the contact surface of said scanner, in the vicinity of the slit, under suction.

19. The image reading and moving unit as claimed in claim 13, further comprising a reference plate provided at a predetermined position along the scan direction, said reference plate being used for correcting a read state of said scanner.

20. The image reading and moving unit as claimed in claim 13, wherein said scanner moving mechanism includes a guide part having said scanner movable provided thereon, and a driving mechanism linearly moving said scanner towards the sheet under guidance of the guide part.

21. The image reading and moving unit as claimed in claim 20, wherein said scanner moving mechanism includes an urging member urging said scanner in a direction away from the sheet.

* * * * *

UNITED STATES PATENT AND TRADEMARK OFFICE
CERTIFICATE OF CORRECTION

PATENT NO.: 5,812,172
DATED : September 22, 1998
INVENTOR(S): Akira YAMADA

It is certified that error appears in the above-identified patent and that said Letters Patent is hereby corrected as shown below:

Col. 7,
    line 42, change "transport" to --transparent--.

Signed and Sealed this

Sixth Day of April, 1999

Attest:

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,812,172
DATED : September 22, 1998
INVENTOR(S) : Akira Yamada

It is certified that error appears in the above-identified patent and that said Letters Patent is hereby corrected as shown below:

Column 3, line 57, change "22," The" to --22. The--.

Signed and Sealed this

Twenty-seventh Day of February, 2001

Attest:

NICHOLAS P. GODICI

Attesting Officer     Acting Director of the United States Patent and Trademark Office